Patented Oct. 18, 1949

2,485,366

UNITED STATES PATENT OFFICE 2,485,366

RESOLUTION OF CONSTANT BOILING MIXTURES OF CHLOROSILANES

Philip Anthony Di Giorgio and Arthur Edward Newkirk, Schenectady, N. Y., assignors to General Electric Company, a corporation of New York No Drawing. Application December 15, 1948, Serial No. 65,506

5 Claims. (Cl. 260—448.8)

The present invention relates to a method of resolving constant boiling mixtures comprising a methylchlorosilane and tetrachlorosilane (silicon tetrachloride). It is specifically concerned with the separation of a constant boiling or azeotropic mixture of trimethylchlorosilane and tetrachlorosilane by converting the chlorosilanes to the corresponding aroxy derivaties by reaction with a monohydric phenol free of substitutents reactive toward chlorosilanes, and separating the aroxy derivatives in any suitable manner, for instance, by fractional distillation.

In the preparation of methyl silicon chlorides either by effecting reaction between silicon and methyl chloride or by effecting reaction between methylmagnesium chloride with silicon tetrachloride, the reaction products comprise a mixture of chlorosilanes including various methylchlorosilanes and tetrachlorosilane. These chlorosilane mixtures cannot be completely separated into their various components by fractional distillation because the trimethylchlorosilane and tetrachlorosilane components not only have approximately the same boiling points (about 57.5° C.) but also form a constant boiling mixture distilling at a temperature of about 54.5° C.

The trimethylchlorosilane and its derivatives are particularly useful for many commercial applications where the presence of tetrachlorosilane cannot be tolerated. Accordingly, it is highly desirable that this azeotrope be resolved without subjecting the compounds to hydrolyzing or resinifying conditions.

The importance of separating the components of the silicon tetrachloride-trimethylchlorosilane azeotrope is evidenced by the numerous methods advanced for accomplishing this purpose. However, these methods have proved to be either inoperative or commercially impracticable.

One suggested method of separation is the formation of the corresponding ethers by alcoholysis, using an anhydrous alcohol, followed by fractional distillation of the products. However, with the common alcohols, such as methyl, ethyl or butyl alcohols, the resulting ethers of the trimethyl silicon derivatives form constant boiling mixtures with the excess unreacted alcohol. Moreover, in the case of methyl alcohol, one of the reaction products, methyl silicate, is known to be an extremely toxic material. Another unsatisfactory feature of using the common alcohols is the fact that, in general, they boil lower than the corresponding trimethylalkoxysilane and consequently any excess unreacted alcohol must first be removed by distillation before the desired products may be so purified. Another disadvantage attending the use of alcohols is that the higher alcohols are only partially soluble in water. Consequently, upon hydrolysis of a compound like trimethylbutoxysilane, the resulting butyl alcohol remains dissolved in the hexamethyldisiloxane and it becomes necessary to perform a second distillation in order to remove the butyl alcohol. Consideration of the disadvantages arising from the use of the reaction of alcohols with the trimethylchlorosilane-silicon tetrachloride azeotrope, in order to separate the components of this azeotrope, clearly indicates the urgent need for a more satisfactory method of accomplishing the separation of these components.

Another method advanced for the resolution of the above-mentioned azeotropic mixture is the use of a nitrile like acetonitrile or acrylonitrile to form a ternary mixture from which the undesired silicon tetrachloride may be removed by azeotropic distillation with the added ternary component. This method requires expensive equipment because of the extremely corrosive nature of the mixture toward metals of construction.

Still another method which has been advanced for the resolution of the trimethylchlorosilane-silicon tetrachloride azeotrope is the reaction of the components with ethylene oxide followed by fractional distillation of the resulting chloroethoxy silicon compounds. This method offers practical difficulties in its use because ethylene oxide is a gas and consequently it must be handled either under pressure or with refrigerated equipment.

We have now discovered that the resolution of an azeotropic mixture comprising trimethylchlorosilane and silicon tetrachloride, specifically an azeotropic mixture of these components, may be readily accomplished without any of the above mentioned difficulties or objections by simply treating the azeotropic mixture with a monohydric phenol of the formula ROH, where R is an organic aromatic radical free of substituents which are reactive toward chlorosilanes, e. g., the substituted and unsubstituted phenyl, naphthyl, biphenyl, etc., radicals. For brevity, compounds embraced by the above-identified formula will hereinafter be identified as a "monohydric phenol." The chlorosilanes are thereby converted to the corresponding phenoxy derivatives, i. e., trimethylphenoxysilane and tetraphenoxysilane, where phenol C₆H₅OH is the specific monohydric phenol used. These compounds show widely divergent boiling points of 177° C. and 408° C.; consequently, they are readily separated by simple distillation.

The separation of any excess unreacted phenol from trimethylphenoxysilane offers no problem because these two materials do not form an azeotropic mixture. Moreover, the more volatile trimethylphenoxysilane may be stripped from the higher boiling phenol without additionally distilling the phenol. In most instances it is not even necessary that the phenol be separated from the trimethylphenoxysilane; treatment of the mixture with dilute aqueous alkali dissolves the phenol and converts the trimethylphenoxysilane to the insoluble hexamethyl disiloxane which may be then skimmed off from the aqueous layer ready for use. Trimethylphenoxysilane may be easily hydrolyzed and may be used in place of trimethylchlorosilane in many applications involving hydrolysis of this silicon compound. On the other hand, if the chloride is specifically desired, it may be regenerated by treating the phenoxy compound with an organic acid chloride in a manner well known to those skilled in the art.

In accordance with our invention, the constant boiling mixture of trimethylchlorosilane and tetrachlorosilane, in which the mol fraction of the trimethyl compound is approximately 0.45, is treated with a monohydric phenol at elevated temperatures (for example, from 100° to 350° C.) to give, as specifically illustrated in the case below by phenol, trimethylphenoxysilane, phenyl orthosilicate and hydrogen chloride according to the following unbalanced equation:

The amount of monohydric phenol employed may be varied within wide limits but is preferably present in an amount equal to at least a slight molar excess of the number of equivalents of hydrolyzable chlorines present in the mixture of trimethylchlorosilane and silicon tetrachloride.

The hydrogen chloride resulting from the above reaction is evolved as a gas in an anhydrous condition suitable for other manufacturing operations. The trimethylphenoxysilane, together with any excess unreacted phenol, is readily separated by simple distillation and the residual aromatic orthosilicate may be used as such for various commercial applications. The mixture of phenol and trimethylphenoxysilane may be treated with dilute alkali to give hexamethyldisiloxane suitable for silicone oil production and a sodium phenate which may be converted readily to the phenol for recycling through the process. Alternatively, if it is desired to isolate pure trimethylphenoxysilane, the mixture of phenol and trimethylphenoxysilane may be fractionally distilled. The phenol, boiling point 182° C., remains in the still pot. No trouble is encountered with this separation because trimethylphenoxysilane and phenol do not form an azeotropic mixture. The purified trimethylphenoxysilane so produced may then be used directly for the production of silicone products or, alternatively, it may be converted to the corresponding trimethylchlorosilane by treatment with an organic acid chloride under suitable conditions.

In order that the process of our invention may be more clearly understood, the following example is given merely by way of illustration but not limitation. All parts are by weight:

*Example*

169 parts C. P. phenol, M. P. 40° C. was placed in a one-liter, 3-neck flask fitted with a —80° C. condenser, thermometer and dropping funnel. 100 parts of an azeotropic mixture consisting of approximately equimolar parts of tetrachlorosilane was added to the phenol at 70° C. over a period of 45 minutes. Steady evolution of hydrogen chloride occurred as the reaction temperature was raised to 225° C. over a period of ten hours. At the end of this time the reaction mixture was found to have lost the theoretical weight of hydrogen chloride. Distillation of the clear, colorless, liquid product gave 52 parts of crude trimethylphenoxysilane boiling at 174° to 187° C. at atmospheric pressure. From the residue 84 parts of phenyl orthosilicate melting at 52–53° C. was isolated. Heating the crude trimethylphenoxysilane with dilute hydrochloric acid for twenty minutes followed by neutralization with alkali gave, after separation, drying and fractional distillation, 12 parts of hexamethyldisiloxane boiling at 100° C. at 756 mm., and having $n^{20}D$ 1.3777.

While the foregoing specific example and discussion have dealt with the reaction of phenol with the azeotropic mixture of chlorosilanes, it should be clearly understood that this is merely by way of illustration and is not intended to limit our invention thereto. The process of our invention may be accomplished also by the reaction of the trimethylchlorosilane-silicon tetrachloride azeotrope with any monohydric phenol free of substituents which are reactive toward chlorosilanes. Thus, in place of phenol itself, C₆H₅OH, we may use any monohydric phenol free of substituents reactive toward chlorosilanes, e. g., hydrocarbon-substituted phenols, such as cresols, naphthols, ethyl phenols, cyclohexyl phenols, etc.; alkoxy (e. g., methoxy, ethoxy, butoxy, etc.), aroxy (e. g., phenoxy, naphthoxy, etc.), alkaroxy (e. g., toloxy, xyloxy, ethylphenoxy, etc.), and aralkoxy phenols (e. g., benzyloxy, phenylethyloxy, etc.), ketophenols; cyanophenols; nitrophenols; phenols substituted with heterocyclic groups; aldehydic phenols; guaiacol; etc. These specific classes of monohydric phenols are cited merely by way of illustration; it will be clear to those skilled in the art that there are many other monohydric phenols free of substituent groups which are reactive toward chlorosilanes which consequently come within the scope of this invention and which may be employed in the practice of this invention.

It is not necessary that individual phenols be used to accomplish the purpose of our invention. In fact, in some cases it may be more economically desirable to use mixtures of isomeric monohydric phenols. Thus, it might be preferable to use, for example, USP cresol which is a mixture of isomeric cresols containing some phenol and xylenols.

What we claim as new and desire to secure by Letters Patent of the United States is:

1. The method which comprises effecting reaction at a temperature of from about 100° C. to 350° C. between (1) a monohydric phenol free of substituent groups reactive toward chlorosilanes and (2) a constant boiling mixture of trimethylchlorosilane and tetrachlorosilane, and separating the aroxy silanes so formed.

2. The method of resolving a constant boiling mixture of trimethylchlorosilane and tetrachlorosilane which comprises reacting said mixture at a temperature between 100° C. and 350° C. with phenol until the corresponding phenoxy derivatives are produced, and subjecting the said phenoxy derivatives to separation by distillation to produce trimethylphenoxysilane and phenyl orthosilicate.

3. The method of resolving a mixture comprising a methylchlorosilane and tetrachlorosilane which comprises heating the aforesaid mixture with a monohydric phenol free of substituents reactive toward the chlorosilanes thereby to convert the chlorosilanes to the corresponding aroxy derivatives, and separating the aroxy derivatives so produced.

4. The method of resolving an azeotropic mixture of trimethylchlorosilane and tetrachlorosilane which comprises heating the mixture of chlorosilanes with phenol thereby to produce the corresponding phenoxy derivatives, and separating the phenoxy derivatives.

5. The method which comprises heating a mixture of isomeric cresols and a constant boiling mixture of trimethylchlorosilane and tetrachlorosilane, thereby converting the chlorosilanes to the corresponding cresoxy derivatives, and separating the cresoxysilanes so formed by distillation.

PHILIP ANTHONY DI GIORGIO.
ARTHUR EDWARD NEWKIRK.

No references cited.

Certificate of Correction

Patent No. 2,485,366                                                 October 18, 1949

PHILIP ANTHONY DI GIORGIO ET AL.

It is hereby certified that error appears in the printed specification of the above numbered patent requiring correction as follows:

Column 4, line 7, after the syllable "silane" insert *and trimethylchlorosilane*; and that the said Letters Patent should be read with this correction therein that the the same may conform to the record of the case in the Patent Office.

Signed and sealed this 28th day of February, A. D. 1950.

[SEAL]

THOMAS F. MURPHY,
*Assistant Commissioner of Patents.*